(12) United States Patent
Fujimori et al.

(10) Patent No.: US 6,312,547 B1
(45) Date of Patent: Nov. 6, 2001

(54) METHOD FOR MANUFACTURING OPTICAL DISKS

(75) Inventors: Jiro Fujimori; Masaaki Motokawa; Haruhisa Maruyama, all of Nakakoma-gun (JP)

(73) Assignees: Pioneer Corporation, Tokyo; Pioneer Video Corporation, Yamanashi, both of (JP)

( * ) Notice: Subject to any disclaimer, the term of this patent is extended or adjusted under 35 U.S.C. 154(b) by 0 days.

(21) Appl. No.: 09/531,126

(22) Filed: Mar. 17, 2000

(30) Foreign Application Priority Data

Mar. 18, 1999 (JP) .................................................. 11-073973

(51) Int. Cl.[7] ...................................................... B24B 31/20
(52) U.S. Cl. .................. 156/242; 156/273.7; 156/275.5; 156/275.7; 156/286; 369/286
(58) Field of Search ................................ 156/74, 99, 106, 156/242, 245, 272.2, 273.7, 275.5, 275.7, 285, 286; 369/286; 428/64.4, 64.6, 65.2

(56) References Cited

U.S. PATENT DOCUMENTS

| | | | | |
|---|---|---|---|---|
| 5,688,447 | * | 11/1997 | Hong | 264/1.33 |
| 5,716,761 | * | 2/1998 | Iida et al. | 430/321 |
| 6,117,284 | * | 9/2000 | Mueller | 204/192.27 |
| 6,136,133 | * | 10/2000 | Maruyama et al. | 156/273.5 |
| 6,154,442 | * | 11/2000 | Kondo et al. | 369/286 |

* cited by examiner

Primary Examiner—Michael W. Ball
Assistant Examiner—John T. Haran
(74) Attorney, Agent, or Firm—Morgan, Lewis & Bockius LLP

(57) ABSTRACT

A method is disclosed for manufacturing an optical disk with multiple layers efficiently with improved reliability. An optically transparent sheet is laminated on a first information recording surface, and an ultraviolet light hardened resin is formed thereon which has a second information recording surface.

8 Claims, 5 Drawing Sheets

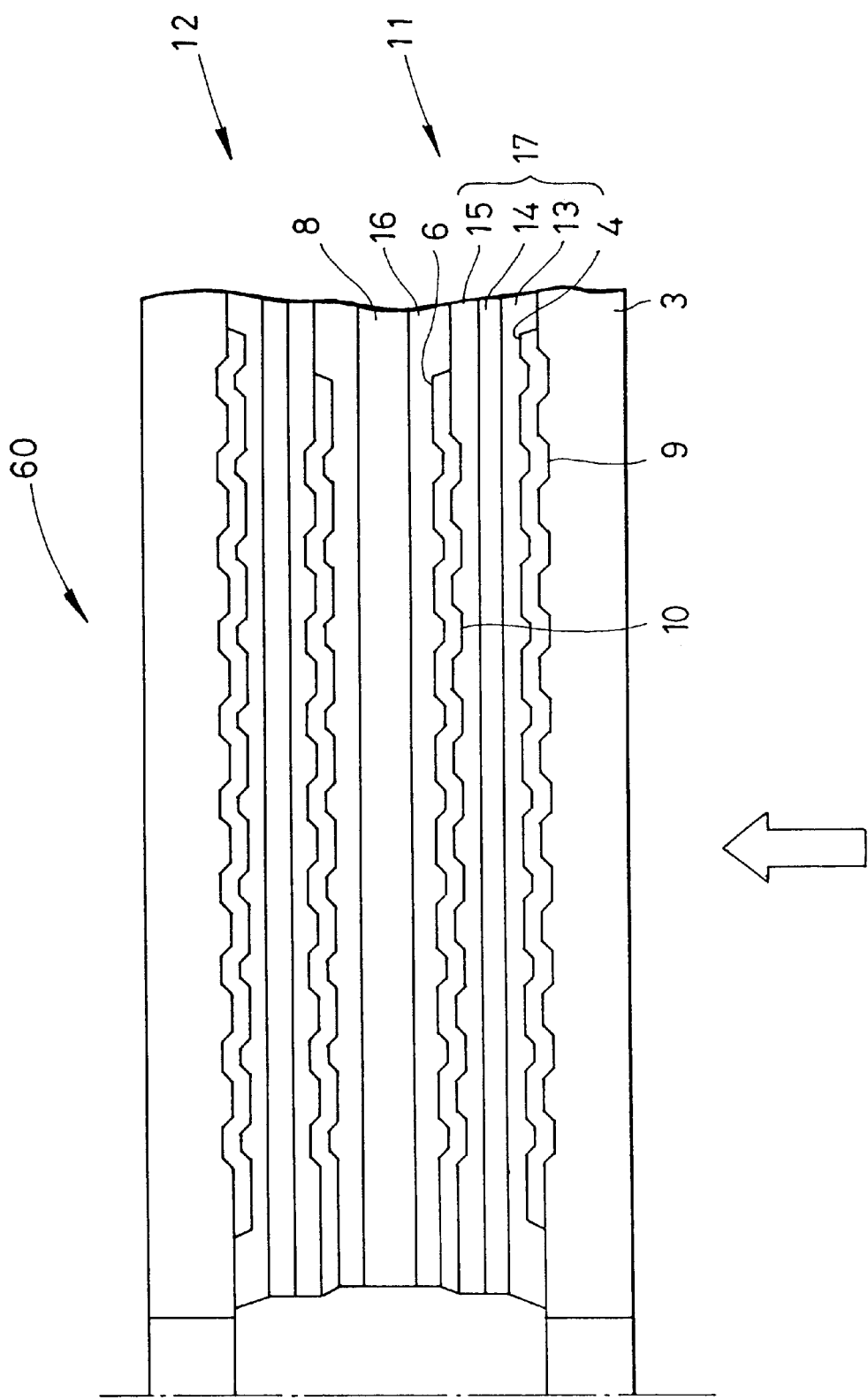

METHOD FOR MANUFACTURING OPTICAL DISKS

BACKGROUND OF THE INVENTION

1. Field of the Invention

The present invention relates to a method for manufacturing an optical disk with multiple layers of recording surfaces.

2. Description of Related Art

As shown in FIG. 1, a conventional optical disk 50 for a type of recording with multiple layers has a first disk 1 having a first and second information recording surface and a second disk 2 having a third and fourth information recording surface with both disks adhered to each other by using an adhesive 8 or the like. The first disk 1 has a configuration in which a first semi-transparent reflective film 4, an intermediate layer 5 having the second information recording surface, a second reflective film 6, and a protection film 7 are laminated in sequence on a first information recording surface of a first optically transparent substrate 3.

First pits 9 for carrying first information signals and second pits 10 for carrying second information signals are formed on the first information recording surface of the first optically transparent substrate 3 and the second information recording surface of the intermediate layer 5, respectively. These first and second pits 9 and 10 have such a shape as to be able to perform reading by means of a reproducing beam that is emitted from the side of the first optically transparent substrate 3 (in the direction shown by the arrow in the figure). The second disk 2 has the same configuration as that of the first disk 1 and an explanation is omitted.

The aforementioned optical disk 50 is manufactured in the processes as shown in FIG. 2A through FIG. 2E.

First, as shown in FIG. 2A, the first optically transparent substrate 3 is prepared on which the first semi-transparent reflective film 4 is formed on the first information recording surface on which the first pits 9 for carrying the first information signals are formed.

Subsequently, as shown in FIG. 2B, with the first reflective layer 4 directed upward, the aforementioned first optically transparent substrate 3 is placed on a spin table 20. The spin table 20 is formed of a disk having a high degree of optical transparency and is provided with a shaft 21, on the center thereof, for attaching the substrate. Since there is provided a center hole 3a at the center of the first optically transparent substrate 3, the first optically transparent substrate 3 is fixedly absorbed to the spin table 20 by inserting the center hole 3a of the first optically transparent substrate 3 onto the shaft 21 of the spin table 20.

Subsequently, a resin P that hardens under an ultraviolet light and which becomes the intermediate layer 5, in a process to be described later, is deposited on the first reflective layer 4 by means of a dispenser (not shown) in the shape of a donut around the center hole 3a of the first optically transparent substrate 3. Thereafter, a stamper 22, on which the second pits 10 for carrying the second information signals are formed, is placed over the first reflective film 4 with the surface where the second pits 10 are formed directed downwardly. Since there is formed a center hole 22a at the center of the stamper 22 in the same way as the center hole 3a of the aforementioned first optically transparent substrate 3, the stamper 22 is placed on the same shaft as the first optically transparent substrate 3 by inserting the center hole 22a of the stamper 22 onto the shaft 21 of the spin table 20.

Subsequently, as shown in FIG. 2C, high-speed rotation of the spin table 20 causes the resin P to spread into the spacing between the stamper 22 and the first reflective film 4, and causes the excessive amount of resin P to be thrown off to form a film of the resin P, uniform in thickness. Subsequently, in the process shown in FIG. 2D, the intermediate layer 5 is formed by irradiating the bottom side of the spin table 20 (in the direction shown by the arrow in the figure) with ultraviolet light so as to harden the resin P.

Subsequently, as shown in FIG. 2E, the stamper 22 is removed to reveal the second pits 10 for carrying the second information signals transferred on the intermediate layer 5. The second reflective layer 6 having a reflectance higher than that of the first reflective film 4 is formed on the second information recording surface to which the second pits of the intermediate layer 5 are transferred. Thereafter, the protection film 7 is formed on the second reflective film 6 to complete the first disk 1.

Then, the second disk 2 with third and fourth information recording surfaces formed by the same processes as those described above and the first disk 1 manufactured in the aforementioned processes are adhered to each other by means of the adhesive 8 with the respective protection films 7 facing each other to complete the optical disk 50.

The optical disk 50 manufactured as described above is designed, for example, so as to read information signals provided by the first pits 9 with the light derived from the semi-transparent reflective film and reflected from the first reflective film 4, the semi-transparent reflective film allows a laser beam incident via the first optically transparent substrate 3 to transmit partially and reflect partially. The optical disk 50 is also designed so as to read information signals provided by the second pits 10 with the light which is transmitted through the first reflective film 4 and the intermediate layer 5, and then reflected on the second reflective film 6. Therefore, it is very important in providing improved reliability in reading information signals to make the intermediate layer 5 uniform in thickness.

It is difficult to make the thickness of the intermediate layer uniform since the aforementioned optical disk 50 employs the liquid-state ultraviolet light hardening resin P in the intermediate layer 5 due to the easy formation of air bubbles therein.

Accordingly, in the case of carrying out the rotational processing by means of the spin table 20, the processing is carried out in a chamber (not shown) in a reduced-pressure state to remove air bubbles contained in the intermediate layer 5. In addition, the intermediate layer 5 is made uniform in thickness by varying the amount of drops of the resin P, and the speed and time of the spin table 20. However, it was very difficult to make the intermediate layer 5 uniform in thickness by controlling the amount of drops of the resin P, and the speed and time of the spin table 20. Because of this problem, air bubbles were not able to be completely removed in the chamber having a reduced pressure.

OBJECT AND SUMMARY OF THE INVENTION

The present invention was developed in view of such circumstances. Its object is to provide an optical disk with an intermediate layer more uniform in thickness than before and with high reliability.

A method for manufacturing an optical disk according to a first aspect of the present invention is characterized by comprising the steps of: forming a first semi-transparent reflective film for reflecting part of the incident light and partly transmitting the incident light onto a first information recording surface of an optically transparent substrate with the first recording surface on one side thereof; laminating an optically transparent sheet on the first reflective film, preparing a stamper with a second information recording surface; applying a liquid-state resin to one of the optically transparent sheets and the stamper, superimposing the optically transparent substrate on the stamper in a space of reduced pressure with the optically transparent sheet and the liquid-state resin interposed therebetween, and pressing the optically transparent substrate and stamper against each other with a predetermined pressure; forming, on the optically transparent sheet, a ultraviolet hardened resin layer to which the second information recording surface is transferred, by irradiating via the optically transparent substrate and the first reflective film with ultraviolet light after the pressure applied to the superimposed optically transparent substrate and stamper has been brought back to an atmospheric pressure; and forming a second reflective film with reflectance higher than that of the first semi-transparent reflective film on the second information recording surface of the resin layer.

A method for manufacturing an optical disk, according to a second aspect of the present invention, is the method for manufacturing an optical disk according to the first aspect of the present invention, characterized by further comprising, before laminating the optically transparent sheet, the step of applying a liquid-state resin to the first semi-transparent reflective film to form a protection film which is hardened by being irradiated with ultraviolet light.

A method for manufacturing an optical disk, according to a third aspect of the present invention, is the method for manufacturing an optical disk according to the first or second aspect of the present invention, characterized in that the resin is from 15 to 400 cps in viscosity when the resin is in a non-hardened state at room temperature.

A method for manufacturing an optical disk, according to a fourth aspect of the present invention, is the method for manufacturing an optical disk according to the first aspect of the present invention, characterized in that a dry photo-curing film of from 3,500 to 400,000 P in viscosity in a non-hardened state at room temperature and from 30 to 60 $\mu$m in thickness in a non-hardened state is used as the optically transparent sheet.

A method for manufacturing an optical disk, according to a fifth aspect of the present invention is the method for manufacturing an optical disk according to the fourth aspect of the present invention, characterized in that the dry photo-curing film comprising the optically transparent sheet is hardened as well in the step of irradiating ultraviolet light from the first optically transparent substrate side.

A method for manufacturing an optical disk, according to a sixth aspect of the present invention, is the method for manufacturing an optical disk according to the first aspect of the present invention, characterized in that an adhesive sheet 30 through 60 $\mu$m in thickness is used as the optically transparent sheet.

A method for manufacturing an optical disk, according to a seventh aspect of the present invention, is the method for manufacturing an optical disk according to the first aspect of the present invention, characterized in that the first semi-transparent reflective film comprises a thin metallic film or a thin dielectric film.

Since the method for manufacturing an optical disk, according to the present invention, is intended to form an intermediate layer with an optically transparent sheet and an ultraviolet light hardening resin layer, an optical disk with multiple layers having an intermediate layer of a predetermined uniform thickness can be obtained efficiently at low cost.

Furthermore, since the process for transferring the second information recording surface to the resin layer is performed in a space of reduced pressure, air bubbles are prevented from coming into the ultraviolet light hardening resin. In addition, a difference in pressure in the atmosphere between the reduced-pressure space and the atmospheric pressure enables air bubbles remaining in the ultraviolet light hardening resin to collapse.

BRIEF DESCRIPTION OF THE DRAWINGS

FIG. 3 is a cross-sectional view of a main portion of an optical disk according to an embodiment of the present invention;

DETAILED DESCRIPTION OF THE EMBODIMENTS

Figure 1:
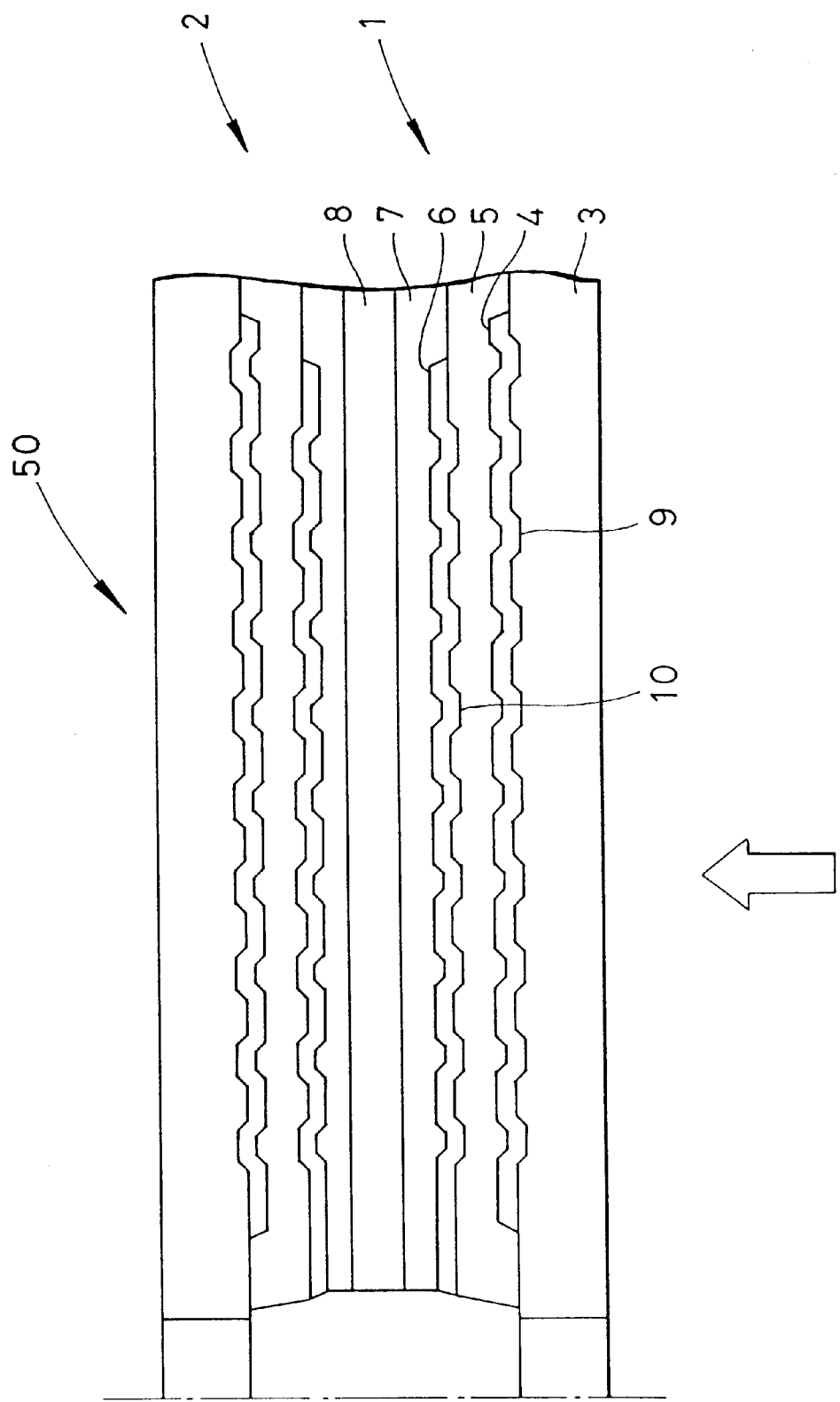
FIG. 1 is a cross-sectional view of a main portion of a conventional optical disk.
Figure 2A:
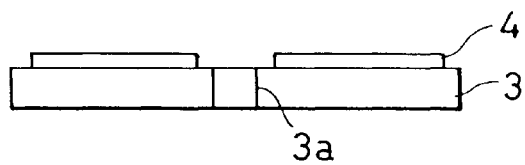
FIG. 2A through FIG. 2E are schematic views of processes showing a method for manufacturing a conventional optical disk.
Figure 2B:
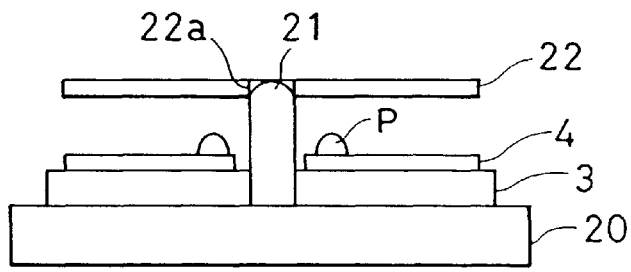
Figure 2C:
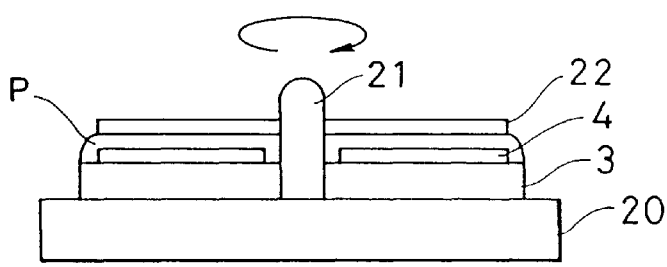
Figure 2D:
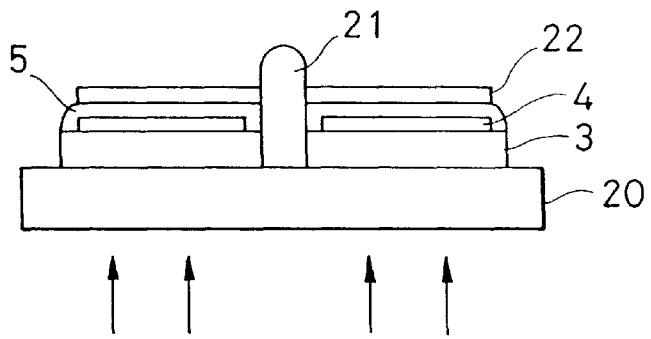
Figure 2E:
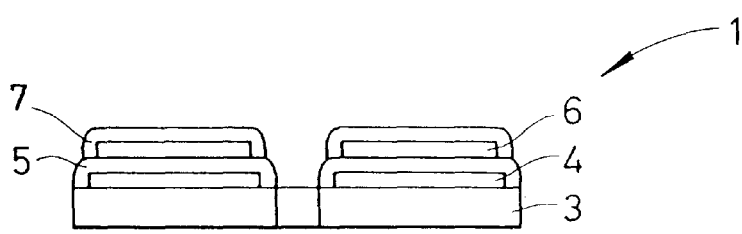

The embodiments of the present invention will be explained below with reference to the drawings. FIG. 3 is a cross-sectional view showing a main portion of an optical disk 60 according to the present invention. Furthermore, reference numbers for components that are provided with functions similar to those of the conventional example in the drawings will remain the same.

As shown in FIG. 3, the optical disk 60, according to the present invention, has a first disk 11 having a first and second information recording surface and a second disk 12 having a third and fourth information recording surface with both disks adhered to each other by using adhesive 8 or the like. The first disk 11 has a configuration in which a first semi-transparent reflective film 4, a first protection film 13, an optically transparent sheet 14, a transfer layer (a resin layer hardened by ultraviolet light) 15 having a second information recording surface, a second reflective film 6, and a second protection film 16 are laminated in sequence on a first information recording surface of a first optically transparent substrate 3. That is, a difference from the aforementioned conventional example is that an intermediate layer 17 is constituted by the aforementioned first protection film 13, the optically transparent sheet 14, and the transfer layer 15.

Since the second disk 12 has the same configuration as that of the first disk 11, an explanation thereof is omitted.

First pits 9 for carrying first information signals and second pits 10 for carrying second information signals are formed between the first information recording surface of the first optically transparent substrate 3 and the second information recording surface of the transfer layer 15 of the intermediate layer 17, respectively. These first and second pits 9 and 10 have a shape so as to permit reading of information therein to be performed by means of a reproducing beam that is emitted from the side of the first optically transparent substrate 3 (in the direction shown by the arrow in the figure).

The optical disk 60 of the present invention is efficiently manufactured by a method to be explained below. FIG. 4A through FIG. 4D and FIG. 5A through FIG. 5D are schematic views of processes showing a preferred embodiment of the method for manufacturing the optical disk 60 according to the present invention.

Figure 4A:
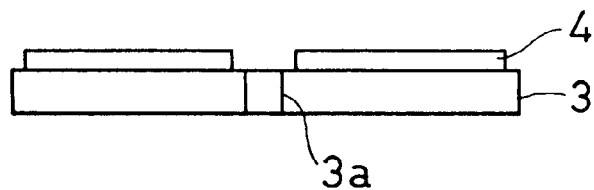
FIG. 4A through FIG. 4D are schematic views of processes showing a method for manufacturing an optical disk according to an embodiment of the present invention.

First, in the first process shown in FIG. 4A, the first semi-transparent reflective film 4 for reflecting part of the incident light and transmitting part of the incident light is formed by a sputtering method, a vacuum deposition method, or an ion plating method on a first information recording surface of the first optically transparent substrate 3 having, on one surface thereof, the first information recording surface.

The material used here for forming the first optically transparent substrate 3 may be any material so long as it is optically transparent, for example, a resin such as polycarbonate (PC) and polymethyl methacrylate (PMMA), or a transparent material such as optical glass. Among various transparent materials, polycarbonate is preferably used since it has excellent resistance to hostile environments and has dimension stability. If the material for forming the first optically transparent substrate 3 is resin, the first optically transparent substrate 3 is formed integrally, for example, by injection molding by using a mold in the cavity of which a stamper is disposed, and the pits 9 are formed on a surface at the same time.

The shape and size of the first optically transparent substrate 3 may be determined as appropriate according to the application of the optical disk. For example, in the case of a digital video disk (DVD), which have recently become topics of conversation, the first optically transparent substrate 3 is approximately 120 mm in diameter and approximately 0.6 mm in thickness, having the shape of a disc with a center hole 3a about 15 mm in diameter at the center thereof. In addition, the pits 9 formed on the first optically transparent substrate 3 have a depth of 0.02 to 1 $\mu$m, preferably 0.05 to 0.3 $\mu$m.

The optical disk 60 of the present invention is required to allow a reproducing beam of light emitted from the side of the first optically transparent substrate 3 at the time of reproducing to reach the second information recording surface. Accordingly, the first reflective film 4 laminated on the first optically transparent substrate 3 is a semi-transparent reflective film for transmitting part of the incident beam of light and reflecting part of the light.

Therefore, an example of the first reflective film 4 may be that of a metallic film thinner than that of a typical reflective film. More specifically, exemplified is a thin metallic film of 100 to 200Å in thickness comprised of gold (Au), silver (Ag), nickel (Ni), aluminum (Al), or the like, or a dielectric thin film comprised of silicon carbide, silicon nitride or the like.

Figure 4B:
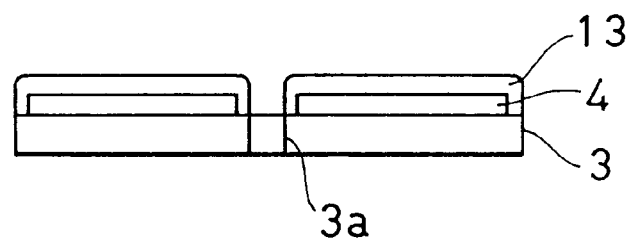

Subsequently, in the second process shown in FIG. 4B, the first protection film 13 is formed on the aforementioned first reflective film 4. The first protection film 13 is to protect an exposed surface of the first reflective film 4 before the optically transparent sheet 14, to be described later, is laminated, and is useful in cases where partially finished products are transported or stored. The first reflective film 4 must be semi-transparent for reflecting part of the reproducing beam of light in order to reproduce the first information signals carried by the pits 9. On the other hand, the first protection film 13 preferably exerts no effects on the transmission of the reproducing beam of light or an ultraviolet light, and thus preferably has an optical transparency of substantially 100%.

As a material for forming the first protection film 13, for example, an ultraviolet light hardened resin may be used. The first protection film 13 having a thickness of 5 to 10 $\mu$m is formed by spin-coating a liquid-state ultraviolet light hardened resin of 15 to 400 cps (centipoise) in viscosity, preferably 15 to 50 cps on the first reflective film 4, and then by being hardened by means of irradiation with ultraviolet light.

Figure 4C:
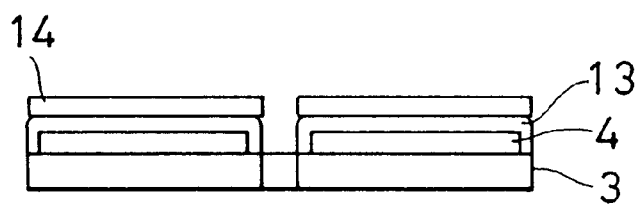

Subsequently, in the third process shown in FIG. 4C, the optically transparent sheet 14 is laminated on the aforementioned first protection film 13. The optically transparent sheet 14 is, for example, an adhesive sheet comprised of an optically transparent acrylic-based adhesive or an optically transparent dry photo-curing film.

The dry photo-curing film 14 is from 3,500 to 400,000 P in viscosity in a non-hardened state at room temperature and 30 to 60 $\mu$m in thickness in a non-hardened state, and has the properties of being hardened by irradiation with ultraviolet light, and containing substantially no solvents.

In addition, in the case of using an adhesive sheet in place of the dry photo-curing film, an adhesive sheet 30 through 60 $\mu$m in thickness in a non-hardened state is employed like the dry photo-curing film.

The dry photo-curing film below 3,500 P in viscosity at room temperature in a non-hardened state may cause a problem to arise in that the film becomes substantially liquid so as to barely maintain film shape or lead to excessive hardening contraction after having been laminated to be adhered to the reflective film or the protection film. On the other hand, a dry photo-curing film of over 400,000 P in viscosity at room temperature in a non-hardened state may cause air bubbles to enter the film in the manufacturing processes of the optical disk and be apt to remain therein, causing adhesion to the reflective film or the protection film to decrease and making no practical use of the dry photo-curing film.

In addition, the dry photo-curing film is comprised of an optically hardening resin composition that is changed to a high polymer by bridging and/or polymerization. As such an optically hardening resin composition, for example, an optically polymerized photo-sensitive resin composition can be used.

Figure 4D:
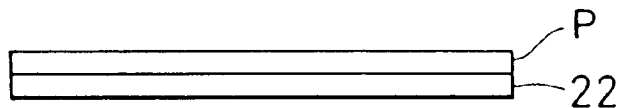

Subsequently, in the fourth process shown in FIG. 4D, the stamper 22 in which the second pits 10 have been formed for carrying the second information signals is prepared. The liquid-state ultraviolet hardened resin P is applied to the information recording surface on which the second pits 10 of the stamper 20 are formed.

The liquid-state ultraviolet light hardened resin P irradiated with ultraviolet light in the seventh process to be described later is hardened to become the transfer layer 15. In addition, the liquid-state ultraviolet hardened resin P is from 15 to 400 cps (centipoise) in viscosity at room temperature in a non-hardened state, preferably 15 to 50 cps, and is applied so that the resin becomes from 5 to 10 $\mu$m in thickness in a non-hardened state by being spin-coated on the information recording surface of the stamper 22.

Figure 5A:
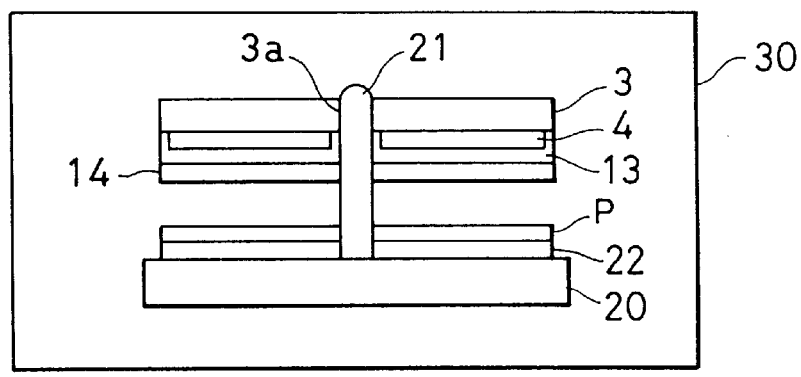
FIG. 5A through FIG. 5D are schematic views of processes showing a method for manufacturing an optical disk according to an embodiment of the present invention.

Subsequently, in the fifth process shown in FIG. 5A, the stamper 22 applied with the liquid-state ultraviolet hardened resin P is placed on the spin table 20 by inserting a center hole (not shown) at the center of the stamper 22 onto the shaft 21 of the spin table 20 disposed in a chamber 30. Then, a partially finished product obtained in the aforementioned third process, that is, the partially finished product in which the first reflective film 4, the first protection film 13, and the optically transparent sheet 14 are laminated in sequence on the first optically transparent substrate 3, is set by a stopper (not shown) in a manner such that the center hole 3a of the first optically transparent substrate 3 is placed on the shaft 21 of the spin table 20 with the optically transparent sheet 14 directed downward to allow the optically transparent sheet 14 to face the liquid-state ultraviolet hardened resin P on the stamper 22 with a small spacing provided therebetween. Thereafter, the chamber 30 is reduced In pressure to a predetermined degree of vacuum (for example, 50 pa or less) inside the chamber.

Figure 5B:
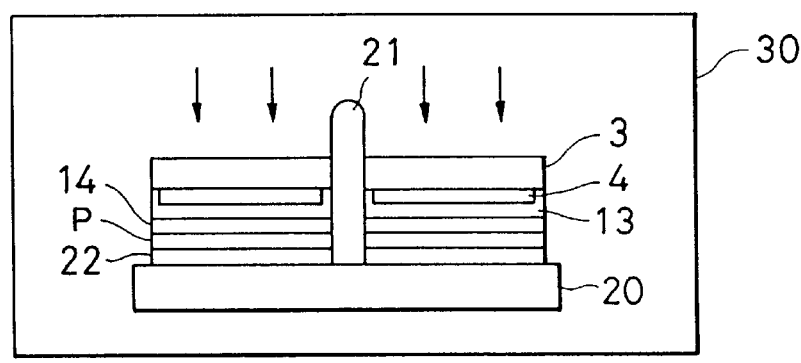

Subsequently, in the sixth process shown in FIG. 5B, the optically transparent sheet 14 and the liquid-state ultraviolet hardened resin P are brought into contact with each other by releasing the stopper while the inside of the chamber 30 kept at a predetermined degree of vacuum, and then pressed by means of the head of a press (not shown). The pressing by means of the head of the press corrects deformations or deflections of the first optically transparent substrate 3.

Thereafter, while the pressing is continued by means of the press head, the interior of the chamber 30 is returned to atmospheric pressure. As such, superimposing the optically transparent sheet 14 upon the liquid-state ultraviolet hardened resin P in a space of reduced pressure can prevent air bubbles from being captured and moreover, the air bubbles remaining inside the liquid-state ultraviolet hardened resin P can be collapsed by the difference in pressure resulting from the returning the chamber to atmospheric pressure to such an extent that optical effects of the bubbles can be neglected.

Figure 5C:
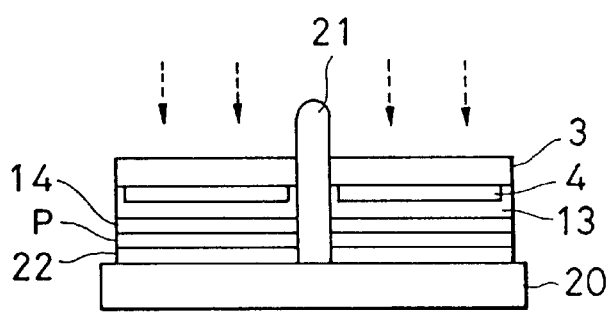

Subsequently, in the seventh process shown in FIG. 5C, pressing by means of the press head is released. Then, the stamper 22 to which the aforementioned liquid-state ultraviolet hardened resin P is applied and the spin table 20 on which the partially finished product is placed are taken out of the chamber 30. The liquid-state ultraviolet hardened resin P is hardened by irradiation with ultraviolet light (in the direction shown by the arrow in the figure) from the side of the first optically transparent substrate 3, and then the stamper 22 is removed, thereby forming the transfer layer 15 to which the second information recording surface has been transferred. Furthermore, in the case of using an optically transparent dry photo-curing film as the optically transparent sheet 14, the liquid-state ultraviolet hardened resin P and the dry photo-curing film are hardened simultaneously by ultraviolet light.

Figure 5D:
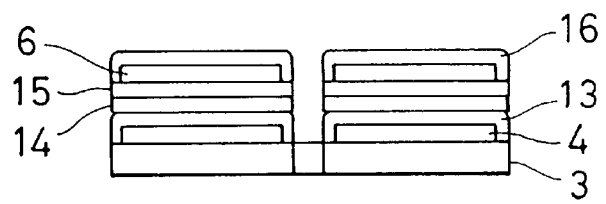

Subsequently, in the eighth process shown in FIG. 5D, the second reflective film 6 having a reflectance higher than that of the aforementioned first reflective film 4 is laminated on the transfer layer 15, and thereafter the second protection film 16 is formed.

Unlike the first reflective film 4, the second reflective film 6 need not be semi-transparent. Therefore, as the forming material of the second reflective film 6, for example, aluminum (Al), an alloy of aluminum (Al), gold (Au), silver (Ag), or copper (Cu) can be used. Among the foregoing, aluminum (Al) and an alloy of aluminum (Al) are preferable.

As the forming method for the second reflective film 6, for example, a sputtering method, a vacuum deposition method, or an ion plating method may be named. Such second reflective film 6 is typically from 0.05 to 0.2 $\mu$m in thickness, preferably from 0.08 to 0.12 $\mu$m.

Like the first protection film 13, the second protection film 16 is hardened by irradiation with ultraviolet light after the liquid-state resin is applied to the second reflective film 6.

The first disk 11 manufactured by the aforementioned first through eighth processes is adhered by means of an affixing apparatus (not shown) to a second disk 12 that has been manufactured in the same processes.

In the affixing apparatus, an adhesive application apparatus employing a roll coating method, a screen printing method, or a spin coating method may be used to apply the adhesive 8 comprised of radical polymer ultraviolet-light hardenined resin or cationic polymer ultraviolet-light hardenined resin or the like, for example, to the second protection film 16 of the first disk 11. Then, the second protection films 16 of the first disk 11 and the second disk 12 are superimposed on each other and the adhesive 8 is irradiated with ultraviolet light by means of an ultraviolet light radiation apparatus to harden the adhesive 8. Thus, the optical disk 60 having multiple layers affixed to each other is completed.

In the aforementioned embodiment, although an explanation has been provided for an example of a two-layer configuration of the first and second disks 11 and 12, an optical disk of multiple layers not affixed to each other but of a single-plate configuration may do as well. In addition, in the above-mentioned embodiment, the optical disk of a two-layer configuration has been shown, however, the present invention is not limited thereto, and a configuration with multiple layers such as one with three layers or four layers may be allowed. In this case, an optical disk of a configuration with three layers or four layers may be implemented by repeating the intermediate layer forming process and the reflective film forming process, which includes the aforementioned processes shown in FIG. 4A through FIG. 4D and FIG. 5A through FIG. 5D.

In addition, in the above-mentioned embodiment, although an example in which the liquid-state ultraviolet hardened resin P is applied to the stamper 22 has been shown, the resin may be applied to the optically transparent sheet 14 instead.

According to the method for manufacturing an optical disk of the present invention, an intermediate layer disposed between the first information recording surface and the second information recording surface comprises an optically transparent sheet and an infrared light hardened resin. The intermediate layer is thereby made uniform in thickness, providing improved reliability of reading information signals from the second information recording surface.

Furthermore, the process of transferring the second information recording surface is performed in a space of reduced pressure environment, thereby preventing air bubbles from entering the ultraviolet light hardened resin. Moreover, a difference in pressure provided when the reduced pressure is returned to the atmospheric pressure may serve to collapse the air bubbles remaining in the ultraviolet hardened resin to such an extent that the bubbles can be optically neglected. Therefore, this enables efficient manufacturing of an optical disk having multiple layers with improved reliability.

What is claimed is:

1. A method for manufacturing an optical disk comprising the steps of:

forming a first semi-transparent reflective film for partly reflecting incident light and partly transmitting the incident light onto a first information recording surface of an optically transparent substrate with said first recording surface on one side thereof, laminating an optically transparent sheet on said first reflective film, preparing a stamper with a second information recording surface, applying a liquid-state ultraviolet hardening resin to one of said optically transparent sheets and said stamper, superimposing said optically transparent substrate and said stamper in an environment of reduced pressure with said optically transparent sheet and said liquid-state resin interposed therebetween, and pressing said optically transparent substrate and said stamper against each other with a predetermined pressure, forming, on said optically transparent sheet, a hardened resin layer to which said second information recording surface is transferred, by irradiating via said optically transparent substrate and said first reflective film with an ultraviolet light after the pressure applied to said superimposed optically transparent substrate and stamper has been returned to an atmospheric pressure, and forming a second reflective film with reflectance higher than that of said first semi-transparent reflective film on the second information recording surface of said ultraviolet light hardened resin layer.

2. The method for manufacturing an optical disk according to claim 1, further comprising, before laminating said optically transparent sheet, the step of applying a liquid-state resin to said first semi-transparent reflective film to form a protection film which is hardened by being irradiated with ultraviolet light.

3. The method for manufacturing an optical disk according to claim 1, wherein said resin is from 15 to 400 cps in viscosity when the resin is in a non-hardened state at room temperature.

4. The method for manufacturing an optical disk according to claim 2, wherein said resin is from 15 to 400 cps in viscosity when the resin is in a non-hardened state at room temperature.

5. The method for manufacturing an optical disk according to claim 1, wherein a dry photo-curing film having a viscosity of from 3,500 to 400,000 P in a non-hardened state at room temperature and 30 to 60 $\mu$m in thickness in a non-hardened state is used as said optically transparent sheet.

6. The method for manufacturing an optical disk according to claim 5, wherein the dry photo-curing film comprising said optically transparent sheet is hardened in the step of irradiating ultraviolet light from said optically transparent substrate side.

7. The method for manufacturing an optical disk according to claim 1, wherein an adhesive sheet of from 30 to 60 $\mu$m in thickness is used as said optically transparent sheet.

8. The method for manufacturing an optical disk according to claim 1, wherein said first semi-transparent reflective film comprises one of a thin metallic film and a thin dielectric film.

* * * * *